United States Patent
Launay et al.

(10) Patent No.: US 9,103,713 B2
(45) Date of Patent: Aug. 11, 2015

(54) ALL-OPTICAL HYDROPHONE INSENSITIVE TO TEMPERATURE AND TO STATIC PRESSURE

(75) Inventors: Francois-Xavier Launay, Biot (FR); Martine Doisy, Plascassier (FR); Raphael Lardat, Roquefort-les-Pins (FR); Gerard Roux, Opio (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 13/642,519

(22) PCT Filed: Apr. 13, 2012

(86) PCT No.: PCT/EP2012/056740
§ 371 (c)(1),
(2), (4) Date: Oct. 19, 2012

(87) PCT Pub. No.: WO2012/140179
PCT Pub. Date: Oct. 18, 2012

(65) Prior Publication Data
US 2014/0036635 A1 Feb. 6, 2014

(30) Foreign Application Priority Data
Apr. 14, 2011 (FR) .................................... 11 01165

(51) Int. Cl.
*G01H 9/00* (2006.01)
*G01V 1/18* (2006.01)
(52) U.S. Cl.
CPC ................ *G01H 9/004* (2013.01); *G01V 1/188* (2013.01)
(58) Field of Classification Search
USPC ....................................................... 367/171
See application file for complete search history.

(56) References Cited

U.S. PATENT DOCUMENTS

| | | | |
|---|---|---|---|
| 5,247,490 A * | 9/1993 | Goepel et al. ................. | 367/149 |
| 6,563,970 B1 | 5/2003 | Bohnert et al. | |
| 7,095,505 B1 * | 8/2006 | Beard et al. .................. | 356/502 |
| 2002/0154860 A1 | 10/2002 | Fernald et al. | |
| 2004/0013040 A1 * | 1/2004 | Maas et al. .................... | 367/140 |

(Continued)

FOREIGN PATENT DOCUMENTS

| | | | |
|---|---|---|---|
| FR | 2946140 A1 * | 12/2010 | |
| WO | 03/106940 A1 | 12/2003 | |
| WO | 2010/136723 A1 | 12/2010 | |

OTHER PUBLICATIONS

World Intellectual Property Org. International Preliminary Report on Patentability for PCT/EP12/056740.. 6 pg.*

Primary Examiner — James Hulka
(74) Attorney, Agent, or Firm — Baker & Hostetler LLP

(57) ABSTRACT

The invention consists of an optical hydrophone, an optical fiber element forming a laser cavity, housed in a mechanical structure which comprises an open cylindrical rigid body, defining the cavity enclosing a fluid and in which the optical fiber element is housed, and closed at its ends by two end caps which keep the optical fiber element permanently under tension, in a longitudinal rectilinear position inside the cavity. The end caps are configured in such a way that when the exterior pressure varies, they undergo a deformation giving rise to a variation in the length of the optical fiber element and that when the temperature varies, they undergo a deformation giving rise to a variation in the length of the optical fiber element which compensates for that induced on this element by the temperature variation. The mechanical structure furthermore exhibits one or more orifices allowing equilibration of the static pressures.

20 Claims, 4 Drawing Sheets

(56) References Cited

U.S. PATENT DOCUMENTS

| | | | |
|---|---|---|---|
| 2004/0184352 A1* | 9/2004 | Woo | 367/149 |
| 2004/0202401 A1* | 10/2004 | Berg et al. | 385/12 |
| 2005/0099889 A1* | 5/2005 | Maas et al. | 367/20 |
| 2005/0122838 A1* | 6/2005 | Maas et al. | 367/20 |
| 2005/0201663 A1* | 9/2005 | Woo | 385/13 |
| 2007/0047867 A1* | 3/2007 | Goldner | 385/12 |
| 2007/0258330 A1* | 11/2007 | Berg et al. | 367/149 |
| 2011/0268384 A1* | 11/2011 | Akkaya et al. | 385/12 |
| 2012/0082415 A1* | 4/2012 | Grosso et al. | 385/37 |
| 2012/0093463 A1* | 4/2012 | Grosso et al. | 385/37 |

* cited by examiner

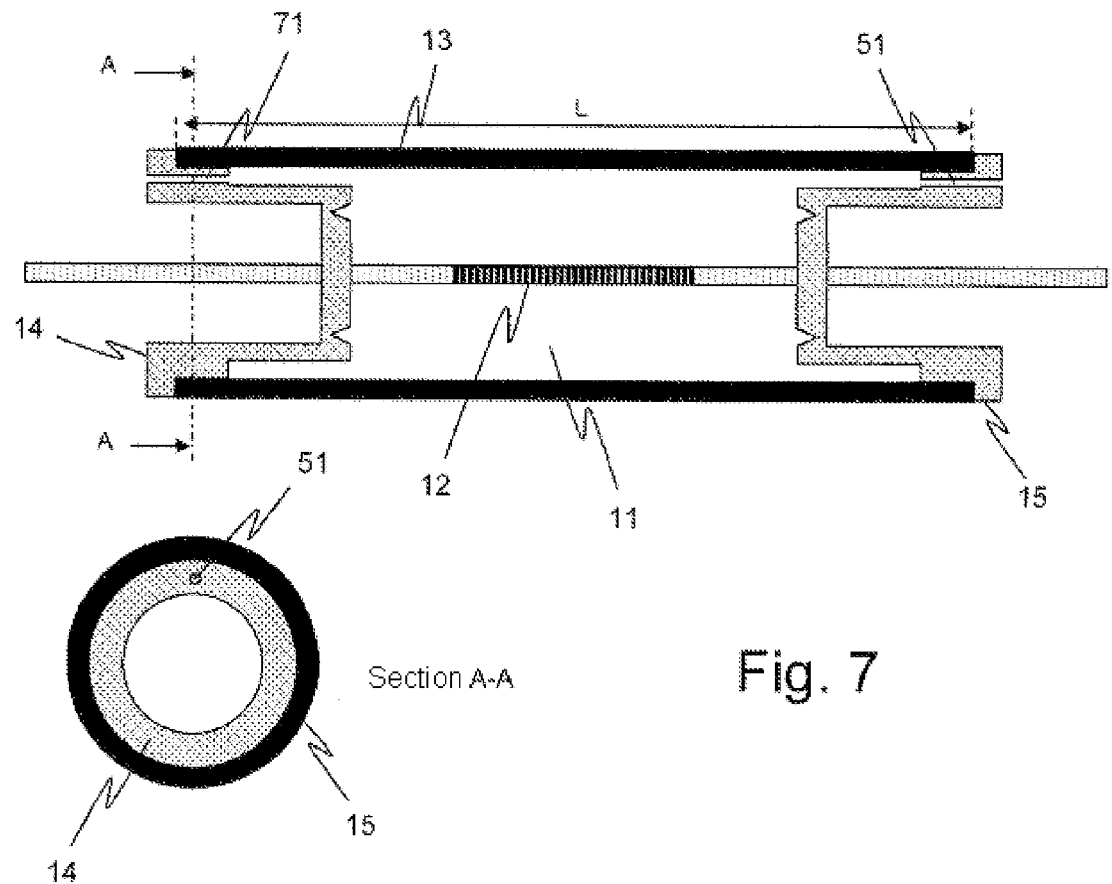
Section A-A          Fig. 7
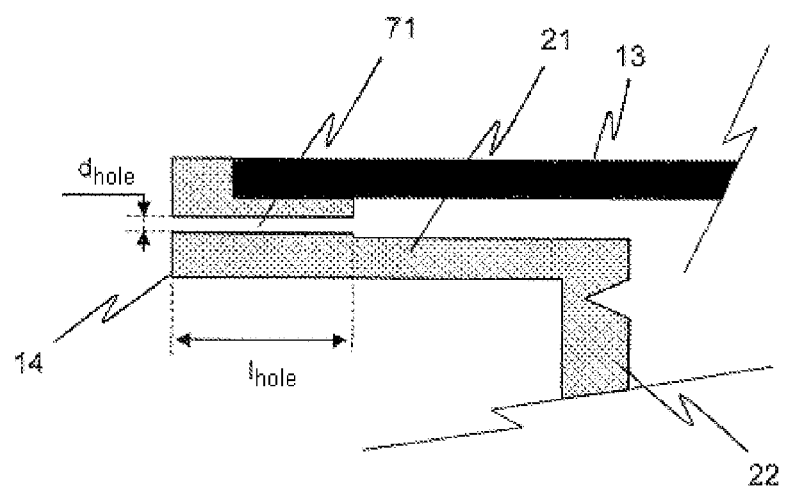
Fig. 8

ALL-OPTICAL HYDROPHONE INSENSITIVE TO TEMPERATURE AND TO STATIC PRESSURE

CROSS-REFERENCE TO RELATED APPLICATIONS

This application is a National Stage of International patent application PCT/EP2012/056740, filed on Apr. 4, 2012, which claims priority to foreign French patent application No. FR 11 01165, filed on Apr. 14, 2011, the disclosures of each of which are incorporated by reference in their entireties.

FIELD OF THE DISCLOSED SUBJECT MATTER

The invention relates to the general field of underwater acoustic transducers or hydrophones. It relates more particularly to optical fiber laser based optical hydrophones.

BACKGROUND

As regards the production of underwater acoustic transducers, the use of optical fibers is a known solution which exhibits recognized advantages which include firstly the small bulk of a hydrophone produced using such technology, as well as the possibility of producing an assemblage of hydrophones on the basis of one and the same fiber by multiplexing on this same fiber the pressure variation information detected by the various hydrophones forming this assemblage, each hydrophone being associated with a given wavelength.

However, in order to obtain sensitivity sufficient to be capable of listening to a very low level of acoustic signal, typically a level below sea state noise 0, on the Knudsen scale, it is known that it is necessary to amplify the deformation of the optical fiber induced by the pressure wave by means of an appropriate acousto-mechanical device.

There currently exist two main classes of optical fiber hydrophones capable of listening to a noise level below sea state noise 0 and therefore potentially usable in hydrophone arrays or in antennas using hydrophones for underwater applications: optical fiber coil interferometric hydrophones and optical fiber laser cavity hydrophones.

In optical fiber coil interferometric hydrophones, the optical quantity measured is the optical phase variation aggregated over the total length of an optical fiber (20 to 100 m typically), coiled on a compliant mandrel configured in such a way that its diameter varies under the effect of the acoustic pressure to be measured, thereby inducing a dynamic variation in the length of the optical fiber wound thereon, an air mandrel for example.

The dynamic variation in the length of the optical fiber is manifested by a variation in the phase of the signal transported by the fiber. Thus, for a standard single-mode silica optical fiber, it may be shown that the relative variation of the phase of the signal is equal to about 0.78 times the relative deformation of the length of the fiber. This phase variation may be measured with the necessary precision by placing the hydrophone in the arm of an unbalanced optical fiber interferometer of Michelson type for example.

This type of hydrophone exhibits the main drawback of not being able to be sufficiently miniaturized. Indeed, in order to transmit the information relating to the pressure measurements carried out by each hydrophone constituting an array, various interrogation and multiplexing techniques well known to the person skilled in the art may be implemented. Their object is to make it possible to link, with the aid of a single optical fiber, all the associated hydrophones within one and the same array to the system charged with utilizing these measurements. However, the multiplexing on a single optical fiber of a large number of hydrophones requires that their insertion losses along the optical fiber be low, typically less than 1 dB. This implies that, in each hydrophone, the optical fiber is coiled on a mandrel exhibiting a minimum diameter, so as to limit to the minimum the losses related to the curvature of the fiber. Now, even by using microstructured optical fibers with a very low admissible radius of curvature (Fiber for FTTH applications), good performance in terms of sensitivity and insertion loss are difficult to achieve with a winding diameter of substantially less than 15 or 20 mm.

Moreover, insofar as each hydrophone constituting the array measures a simple pressure value, it is necessary to introduce into the hydrophone array, one or more optical fiber coil reference sensors, not subjected to the acoustic pressure, so as to circumvent by subtraction the variations in the intrinsic sensitivity of the optical fiber coil to static pressure and to temperature. This procedure exhibits the drawback of having to add further sensors and of limiting the domain of use of the hydrophone in immersion (limited dynamic range of the sensor).

Optical fiber laser cavity hydrophones make it possible to produce hydrophones of high sensitivity, that is to say capable of listening to low-level sea noise. Their implementation makes it possible to employ techniques of coherent optical processing to precisely measure the frequency variations of the optical signal conveyed by the fiber. Such a variation is here consequent upon the reception of an acoustic signal by a Bragg grating inscribed in an active optical fiber, an Erbium or Erbium/Yttrium doped optical fiber for emission around 1.5 µm for example.

In a known manner a Bragg grating includes, in proximity to its center, a phase jump of substantially equal to Tr so as to constitute a monofrequency laser cavity, the optical pumping of the cavity being achieved by way of a diode (pumping diode) which may be sited remotely a long distance away via a standard optical fiber. The emission frequency of the laser cavity thus constituted depends on the spacing of the Bragg grating and the central phase of the phase shift. Therefore, if the laser cavity is uniformly deformed, the emission frequency of the laser will vary in the same proportions with a coefficient of 0.78 related to the elasto-optical properties of the silica constituting the fiber.

It is thus possible to wavelength multiplex several hydrophones having laser cavities exhibiting different operating wavelengths, lying in the amplifying band of the doping material of the active optical fiber: about 40 hydrophones, for example, in the case of an Erbium doped fiber, for wavelengths lying on the 100 GHz ITU grid of band C of Erbium.

However, the axial deformation induced by an acoustic pressure applied directly to the external surface of the laser cavity is not sufficient to obtain hydrophone sensitivity compatible with a level of less than sea state noise 0, having regard to the PSD (power spectral density) of the intrinsic noise of the laser (of the order of 20 Hz/$\sqrt{Hz}$ to 1 kHz) which limits the noise of the interrogation system. It is indeed possible to show that it is necessary to have a hydrophone sensitivity of greater than at least 100 or 110 dB Hz/Pa in order to be capable of listening to a sea state noise 0 on the Knudsen scale in a band of about 10 Hz to 10 kHz.

Therefore, it is necessary to amplify the deformation of the cavity induced by the acoustic pressure by means of an acousto-mechanical device. Having regard to the intrinsic sensitivity of the laser cavity to a deformation the objective to be achieved for the acousto-mechanical device is of the order of a nanostrain/Pa with a stable response in a broad frequency band. Several known configurations make it possible to achieve these values. Nonetheless, in all these configurations the hydrophone retains an intrinsic sensitivity to temperature at least equal to that of the laser cavity together with sensitivity to static pressure, without being associated with a voluminous hydrostatic filter.

Thus, in the current state of the prior art, no technical solution belonging to one or the other of these two classes makes it possible to ensure, in an intrinsic manner, the insensitivity of an optical fiber hydrophone to variations in static pressure and to variations in temperature. Now, the operation of a hydrophone under varied environmental conditions (variation of immersion and of temperature, acceleration), is actually possible only if its behavior is actually independent of immersion depth, stated otherwise of static pressure, of temperature and of accelerations.

Moreover, in the case of arrays of sensors it is also very important to have acoustic sensors exhibiting stable interrogation wavelengths, so as to be able to access the various sensors via a single optical fiber by multiplexing and to carry out the wavelength multiplexing and demultiplexing of the information regarding pressure transmitted by the various sensors by simply using optical fiber passive components.

SUMMARY

An aim of the invention is to propose a structure making it possible to produce an optical hydrophone which is intrinsically insensitive to variations in static pressure and in temperature, and very good hydrophone sensitivity. Another aim of the invention is to propose a structure exhibiting a low volume. Yet another aim is to propose a structure making it possible to produce an optical hydrophone capable of operating satisfactorily in a broad frequency band and up to very great immersions with a very low sensitivity to accelerations.

For this purpose the subject of the invention is a laser optical cavity hydrophone of the type comprising a Bragg grating optical fiber element forming the laser cavity. Said hydrophone comprises a mechanical structure forming a cavity filled with a fluid, and inside which the optical fiber element is placed along the longitudinal axis of the cavity, the mechanical structure furthermore comprising:
  a substantially cylindrical hollow rigid body forming the cavity inside which is placed the optical fiber element;
  two end caps configured and designed to seal the ends of the rigid body and traversed by the optical fiber element, said optical fiber element being fixed to the end caps at the level of the points of traversal so as to be permanently under tension.

According to the invention, the two end caps are configured, having regard to the material from which they are made, so as to exhibit a longitudinal deformation when they are subjected:
  to variations in the pressure exerted by the exterior medium in which the hydrophone is immersed; the deformation of the end caps giving rise to a variation in the length of the optical fiber element;
  to temperature variations of the exterior medium in which the hydrophone is immersed; the deformation of the end caps giving rise to a variation in the length of the optical fiber element which compensates the variations of the emission frequency of the laser cavity as a result of these temperature variations.
  a through orifice configured to effect communication between the cavity and the exterior medium and to achieve equilibration of the static pressure between the exterior medium and the fluid contained in the cavity.

According to a preferred embodiment, the rigid body and the two end caps are configured in such a way that the hydrophone exhibits symmetry planes arranged so as to minimize its sensitivity to parasitic accelerations.

According to a particular embodiment, the dimensions of the rigid hollow body are defined in such a way that the mechanical cavity formed can accommodate the optical fiber element and that, having regard to their dimensions, the end caps undergo, under the action of the dynamic variations in the pressure exerted by the exterior medium, a deformation sufficient to induce on the optical fiber element a variation in length making it possible to obtain the desired sensitivity of the hydrophone to dynamic variations in pressure.

According to another particular embodiment, the dimensions, length $l_{hole}$ and cross-section $S_{hole}$, of the through orifice are determined in such a way that, having regard to the viscosity of the fluid contained in the hydrophone cavity, the latter exhibits, having regard to its volume $V_{cavity}$, a law of variation of its sensitivity to pressure variations, as a function of the frequency of these variations, exhibiting a given span of frequencies of variation of the pressure a substantially constant sensitivity, this span of frequencies being situated before the frequency F2 corresponding to the mechanical resonance peak of the cavity.

According to a variant of the previous embodiment where the fluid contained in the cavity is hardly if at all viscous, the dimensions of the through orifice are determined in such a way that, the span of frequencies of variation of the pressure for which the sensitivity of the cavity of the hydrophone is substantially constant lying between the frequency F2 and a resonance peak (51) at a frequency F1 equal to the Helmholtz frequency $f_H$ of the cavity defined by:

$$f_H = \frac{c}{2\pi}\sqrt{\frac{S_{hole}}{V_{cavity} l_{hole}}}$$

where c represents the velocity of the acoustic waves in the considered fluid. the frequency $f_H$ is as low as possible.

According to another variant of the previous embodiment where the fluid contained in the cavity is viscous, the dimensions of the through orifice are determined in such a way that, the span of frequencies of variation of the pressure for which the sensitivity of the cavity of the hydrophone is substantially constant lying between the frequency F2 and a frequency F1 equal to the cutoff frequency $f_p$ of the cavity defined by the relation:

$$f_P = \frac{R_{hole}^4 \rho c^2}{16 \eta l_{hole} V_{cavity}}$$

where ρ represents the density of the fluid, c the velocity of the acoustic waves in the fluid and $R_{hole}$ the radius of the orifice, the frequency fp is as low as possible.

According to a particular embodiment, the two end caps closing the cavity constituted by the rigid body have a hollow cylinder shape open at one end, said cylinder, configured to be inserted into the cavity so as to seal the end thereof and exhibiting a substantially cylindrical side-wall and an elastic end-wall in the shape of a disk, perpendicular to the longitudinal axis of the cavity, and sealing the end of the end cap which is inserted into the cylindrical body, the elastic end-wall being configured to deform under the action of the variations in the pressure exerted by the exterior medium; the side-wall comprising at least two segments:

- a first segment B for which the thickness of the material constituting the wall is determined in such a way that the side-wall of the end cap comes into tight (leaktight) contact with the internal wall of the rigid body, so as to ensure a rigid link between the rigid body and the end cap;
- a second segment C for which the thickness of the material is defined in such a way that the side-wall of the end cap can deform freely in the longitudinal direction under the action of the temperature variations.

According to a variant of the previous embodiment, the side-wall of the end cap furthermore comprises an end-segment A whose thickness defines a shoulder which abuts the end of the rigid body when the end cap is put in place on the latter.

According to a particular embodiment, the dimensions of the cavity and the nature of the materials constituting the rigid body and the end caps are determined so as to obtain the highest possible frequency F2.

According to a particular embodiment, the cavity accommodating the optical fiber element contains an open foam, said foam being soaked with the fluid contained in the cavity, the material constituting the foam being defined so as to damp the natural resonant modes of the optical fiber element.

According to a particular embodiment, the through orifice is a circular orifice made through the wall of the rigid body.

According to another particular embodiment, the through orifice is a circular orifice made longitudinally in the thickness of the side-wall of a end cap.

According to another particular embodiment, the rigid body is made of titanium or glass.

According to another particular embodiment, the end caps are made of PPO plastic or of polyoxymethylene (POM) or else of polyformaldehyde.

According to another particular embodiment, the rigid body or the end caps being made entirely or in part from a porous material, the through orifice consists of the pores of the material.

BRIEF DESCRIPTION OF THE DRAWINGS

The characteristics and advantages of the invention will be better appreciated by virtue of the description which follows, description of a particular, exemplary embodiment not limiting the scope of the invention, which is supported by the appended figures which represent:

FIGS. 7 and 8, illustrations presenting the structure of the hydrophone according to the invention in a particular embodiment.

DETAILED DESCRIPTION

The subsequent description presents the characteristics of the optical hydrophone according to the invention, through a preferred embodiment, taken here as exemplary embodiment not limiting the scope or extent of the invention. The structure of this particular embodiment as well as the account of its operating principle is notably illustrated by FIGS. 1 to 6.

The hydrophone according to the invention comprises a protective mechanical structure defining a cavity 11 inside which a Bragg grating optical fiber element 12 is placed. In addition to a protective function, this cavity also has the function, in a known manner, of amplifying the axial deformation imposed on the optical fiber element 12 by the dynamic pressure exerted by the exterior medium.

In a known manner, the optical fiber element 12 constituting the Bragg grating optical fiber monofrequency laser cavity, which forms the sensitive part of the hydrophone, fulfills three distinct functions:

- a pressure sensor function utilizing the variation in emission frequency of the laser cavity associated with an axial elastic deformation, by stretching and/or retraction, of the optical fiber cavity which constitutes the main element of the sensor;
- a function of transmitting the luminous signal carrying the measurement;
- a multiplexing function by virtue of the wavelength selectivity given by the Bragg grating constituted by the optical fiber element 12, the active part of the hydrophone.

Hereinafter in the text, insofar as the characteristics of the optical fiber monofrequency laser cavity used are in the known domain, the technical characteristics of the mechanical structure forming the cavity 11 of the hydrophone according to the invention enclosing the optical fiber element 12 are more particularly described.

Figure 1:
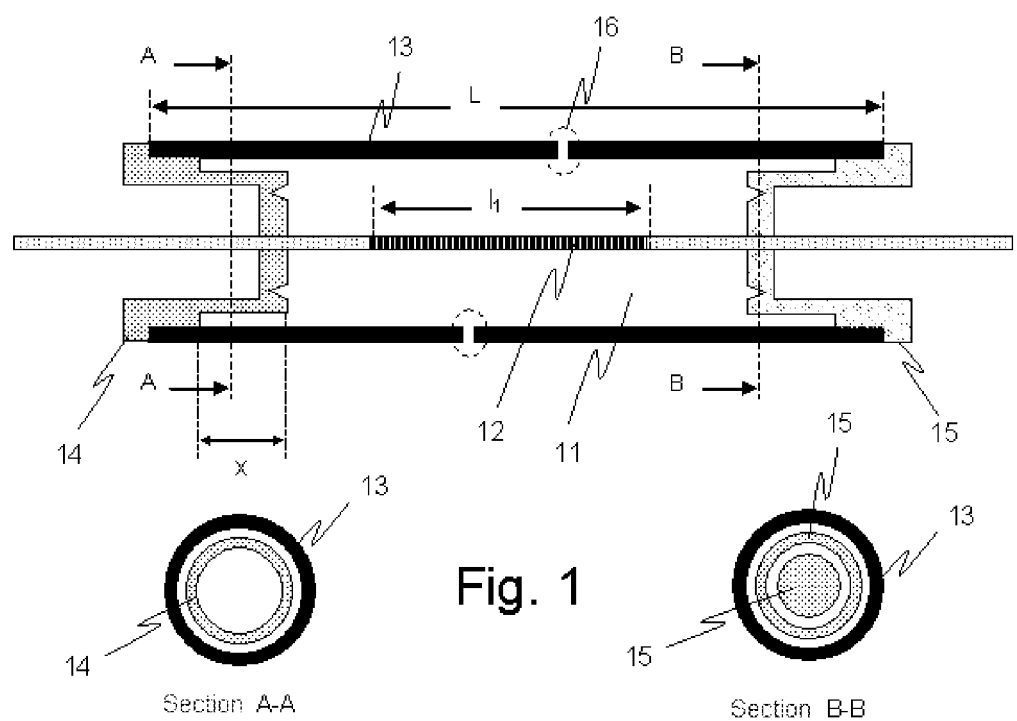
FIG. 1, a schematic illustration presenting the general structure of the hydrophone according to the invention.
Figure 2:
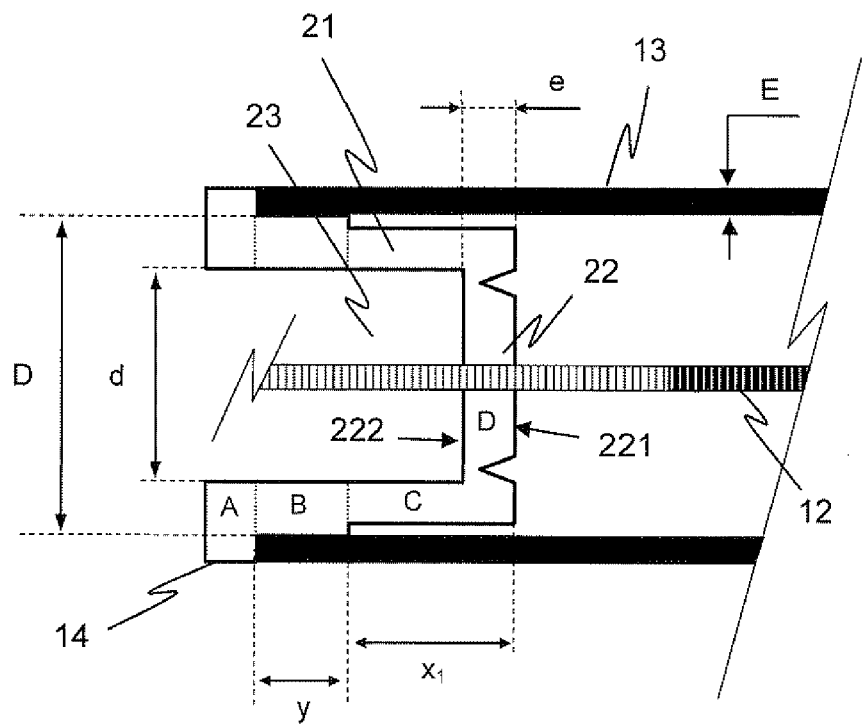
FIG. 2, a schematic illustration presenting the general structure of the end caps constituting the ends of the hydrophone according to the invention.

From a general point of view, as illustrated by FIGS. 1 and 2, the optical hydrophone according to the invention thus consists of a mechanical structure comprising a rigid body of cylindrical shape 13 closed on each side by a end cap 14 or 15.

Generally within the framework of the invention, the notion of cylinder is considered in its most general definition. Here we consider the mathematical definition of the cylinder, the latter being able for example to be a right prism in the case of a polygon-shaped base or of a cylinder of revolution in the case of a circular base.

To minimize the sensitivity to parasitic transverse accelerations, it is however preferable to use a cylinder of revolution for its axisymmetry which confers a certain insensitivity to accelerations of this type. Moreover, on account of the existence of a symmetry plane of the cylinder, perpendicular to the fiber, the use of a cylinder of revolution also makes it possible to minimize the sensitivity to parasitic axial accelerations.

In a preferred embodiment, the rigid body is therefore an axisymmetric right cylinder whose generating straight line is the axis of the optical fiber.

Alternatively, in another embodiment, the rigid body is a hyperboloid or a generalized ellipsoid. Moreover, as in the case of the cylinder of revolution, an axisymmetric geometry makes it possible to minimize the sensitivity to parasitic transverse accelerations.

Thus, if we define the orthonormal frame (Oxyz) where O is the center of the fiber and (Oz) is the axis of the fiber, the generic equation which defines a hyperboloid or an ellipsoid of revolution is then obtained:

$$x^2+y^2=f(z)$$

with f is a strictly positive function.

It is then possible to minimize the sensitivity to parasitic axial accelerations if z=0 is a symmetry plane. Therefore, the function f must be an even function.

The end caps 14 and 15 are configured so as to form two pistons located at the two ends of the cylindrical body whose displacement, deformation, under the action of the variations in the pressure exerted by the medium, causes the volume of the cavity 11, as well as the length of the Bragg grating optical fiber element 12 housed in this cavity, to vary.

The optical fiber element 12, forming the active part of the hydrophone, is placed along the central axis of the cylindrical body 13 defining the cavity 11. Thus it enters and exits the cavity 11 by passing through the walls of the end caps 14 and 15, to which walls it is fixed in such a way that when the hydrophone is assembled, it undergoes a pre-tension. In this way, the deformation (the displacement) of the end caps 14 and 15 under the action of the pressure exerted by the medium gives rise systematically to a variation in the length of the optical fiber element 12 enclosed in the cavity 11.

The device according to the invention also comprises one or more through orifices 16 whose function is to place the interior medium contained in the cavity 11, delimited by the cylindrical body 13 and the two end caps 14 and 15, permanently in contact with the exterior medium. The orifices 16 advantageously allow the pressures prevailing inside and outside the cavity 11 to balance so that the device is thus insensitive to static pressure. Therefore the static pressure being identical inside and outside the cavity 11, the pistons formed by the end caps 14 and 15 do not experience its influence. Therefore, the Bragg grating optical fiber element 12 does not experience on the part of the end caps any stress consequent upon the static pressure exerted on the latter.

According to the invention, the dimensional characteristics of the cavity 11 formed as well as the size and the arrangement of the end caps 14 and 15 and communication orifices 16 are determined so as to carry out the following functionalities:

sufficient mechanical amplification of the deformation caused by the dynamic pressure exerted by the exterior medium on the optical fiber element 12, to achieve the hydrophone sensitivity aimed at;

low-pass hydrostatic filtering intended to place the laser cavity, consisting of the optical fiber element 12, in equi-pressure with the pressure of the medium surrounding the hydrophone, for the pressure variations of frequency below a given cutoff frequency;

compensation of the variations in the emission frequency of the optical fiber laser cavity 12 with temperature;

the symmetry planes of the device as a whole make it possible to minimize the sensitivity to parasitic accelerations.

Therefore, according to the invention, the cylindrical body 13, consists of a cylindrical tube made of a rigid material rendering it hardly deformable under the effect of pressure.

In a preferred embodiment, it is made of titanium, titanium being chosen for its rigidity and its low thermal expansion. Alternatively it can also be made of any appropriate rigid material, compatible with the filling fluid.

Of rigid structure, the cylindrical body 13 thus advantageously takes only a negligible part in the net deformation. It thus takes no part whatsoever in the amplification of the deformation exerted by the structure on the optical cavity constituted by the optical fiber element 12, this amplification being ensured by the end caps 14 and 15.

The thickness E of the wall of the cylindrical body 13, generally constant, is also defined so as to ensure the necessary rigidity having regard to the maximum pressure that the body has to undergo. Its length L is for its part imposed by the length of the optical fiber portion that it has to accommodate, this length being, preferably, sufficient such that the optical fiber element 12 is fixed to the end caps 14 and 15 in a zone 18 or 19 of simple luminous conduction, which does not correspond to the Bragg grating forming the laser cavity, the Bragg grating, of length $l_1$, thus not being fixed directly to the end caps 14 and 15 by its ends.

The interior diameter D of the cylindrical body 13 is for its part defined as a function of the dimensional characteristics imposed on the end caps 14 and 15 so as to fulfill their function of amplification and compensation for the effects of temperature variations on the behavior of the optical cavity formed by the optical fiber element 12.

According to the invention, the end caps 14 and 15 are, for their part, configured to fulfill various functions:

a conventional function of sealing the cylindrical body 13 the object of which is to hermetically close the cavity 11 in such a way that the interior medium communicates directly with the exterior medium only via the orifices 16 made in the structure of the hydrophone;

a function of keeping the optical fiber element housed in the cavity 11 tensioned, in particular the element 12 which forms the laser cavity;

a function of modulating the tension applied to the optical fiber element, as a function of the variations in the temperature of the medium;

a piston function making it possible to vary the length of the optical fiber element 12 housed in the cavity 11 under the action of the dynamic pressure variations exerted on the hydrophone, a pressure increase being manifested by a displacement of the end caps, or at least of the internal end of the end caps, toward the interior of the cavity 11 and by a decrease in the tension imposed on the optical fiber element 12 and a pressure reduction being manifested by a reverse displacement and by an increase in the tension imposed on the optical fiber element 12.

Therefore, to fulfill these functions, various embodiments of the end caps 14 and 15 are conceivable, in particular embodiments implementing end caps exhibiting a part, rigidly tied to the cylindrical body 13, intended to keep the end cap in place on the latter, and a part which is mobile or free to deform being able to move inside the cavity, toward the center of the cavity or toward its end, while entraining in its motion the optical fiber element 12 which is attached to it.

For this purpose the end caps 14 and 15 can therefore, for example, consist, at least in part, of an elastic material, a substantially less rigid material than the material constituting the cylindrical body 13, of PPO plastic of Noryl® type for example or else of polyoxymethylene (POM) or of polyformaldehyde, of Delrin® type for example.

FIG. 2 presents the structure of the end caps implemented in the preferred embodiment taken as example.

In this particular embodiment each end cap 14 or 15 is formed by a hollow body comprising a wall 21. This wall 21 defines a cylindrical, in the mathematical sense of the term, cavity 23. In the case where this cylindrical cavity is a cylinder properly speaking, it exhibits a constant internal diameter d. The cylindrical cavity 23 exhibits an axis of symmetry coincident with that of the cylindrical body and of an elastic wall D 22, for example disk-shaped, perpendicular to the axis of symmetry of the cylindrical cavity 11 and sealing one of the ends of the cavity 23, the other end being open. The end cap thus constituted is intended to be inserted into the cavity 11 by its end sealed by the wall 22. The hollow body and the wall 21 are, for example cylindrical bodies, in the mathematical sense of the term.

According to this embodiment, the wall 21 is a wall whose non-constant thickness essentially defines two distinct segments B and C for which the end cap exhibits distinct exterior diameters. However, this wall could also comprise just the free segment C.

The wall 21 of the end cap therefore comprises a first segment B whose thickness is defined in such a way that when the latter is inserted into the cavity 11 of the hydrophone its wall, at the level of the segment B, is placed in tight, preferably leaktight, contact with the internal wall of the cylindrical body 13, by tight keying for example, in such a way that the wall of the end cap is kept in a fixed position in the cavity 11 of the hydrophone at the level of the segment B.

It also comprises a second segment C whose thickness is smaller than that of the segment B. In this way, the segment C not being in contact with the internal wall of the cylindrical body 13, it appears free to expand or to contract longitudinally, as a function of temperature variations notably.

According to a particular embodiment, the wall 21 can further comprise an end-segment A whose thickness defines a shoulder which abuts the end of the cylindrical body 13 when the end cap is put in place on the cylindrical body 13.

It should be noted that the end caps can as a function of the geometric shape of the rigid body 13 be of cylindrical, hyperboloid or ellipsoid shape on condition however that they exhibit the 3 segments: the segment B in tight and leaktight contact with the rigid body, the segment C free to expand with temperature variations and whose projected length on the axis of the fiber is equal to x and the wall D, 22 perpendicular to the fiber.

Stated otherwise, the end cap comprises a part rigidly tied to the body 13. This part rigidly tied to the cylindrical body 13 comprises the parts A and B but could equally well be made differently provided that the end cap is rigidly tied to the cylindrical body 13.

The part of the end cap free to deform being able to move inside the cavity, entraining in its motion the optical fiber element 12 comprises the part C which is free to expand or to contract longitudinally as a function of temperature variations. This part also comprises the membrane D.

Each of the two end caps must in fact exhibit a part rigidly tied to the body 13 and a part which is mobile with respect to the body 13 comprising a deformable wall able to be deformed when it is subjected to variations in the pressure exerted by the exterior medium in which the hydrophone is immersed; the deformation of the end caps giving rise to a variation in the length of the optical fiber element 12. The deformable wall exhibits an internal face 221 directed toward, that is to say facing, the interior of the cavity and an external face 222 directed toward the exterior of the cavity. It is arranged in such a way that its internal face 221 is mobile in translation with respect to the rigid body 13 along the longitudinal axis of the cavity under the effect of a variation in the temperature of the exterior medium in which the hydrophone is immersed; giving rise to a variation in the length of the optical fiber element 12 which at least partially compensates for the variations in the emission frequency of the laser cavity as a result of these temperature variations.

The material and the geometry of the mobile parts of each of the end caps comprising the length of the mobile part of each of the end caps are such that the deformation of the end caps under the effect of a temperature increase gives rise to a decrease in the length of the fiber held between the two end caps, the effect of which is to decrease or indeed cancel the increase in the emission wavelength of the laser cavity due to the increase in the optical index of the fiber under the effect of this temperature increase.

In the embodiment described previously the deformable wall is the elastic wall 22. This wall is mobile in translation along the longitudinal axis under the effect of temperature variations because the part C is able to contract or expand freely in the longitudinal direction under the effect of temperature variations, thereby giving rise to a displacement of the elastic wall 22 in the longitudinal direction with respect to the body 13.

The end caps could be made differently. It would be possible to design end caps exhibiting a part which is fixed with respect to the rigid body 13 and a part which is mobile in translation with respect to the body 13 along the axis of the cavity consisting of a deformable wall 22 perpendicular to the axis of the cavity. The translational motion of the internal face 221 along the axis of the cavity would then be engendered by the expansion and contraction of the deformable wall.

From a dynamic point of view, the operation of the device according to the invention comprises three states:

A rest state, illustrated by FIG. 1, for which the pressure inside the cavity and the pressure of the exterior medium are identical. In this state, the constraints exerted by the exterior medium and by the interior medium on the end caps, on the walls 22 in particular, balance so that they do not undergo any deformation (i.e. neither stretch nor compression).

Figure 3:
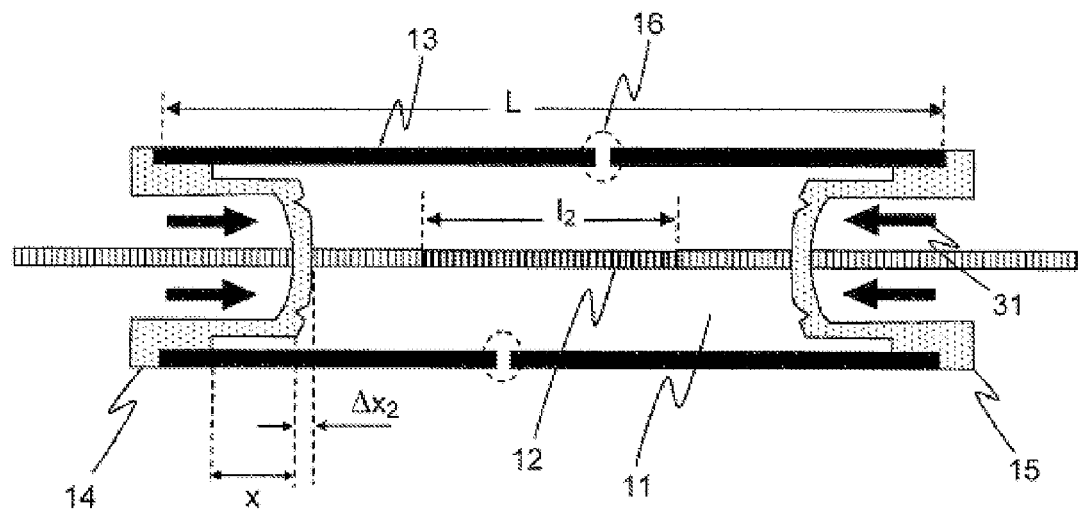
FIGS. 3 and 4, illustrations presenting the behavior of the hydrophone according to the invention under the action of the dynamic variations in the pressure exerted by the exterior medium.

A first dynamic state, illustrated by FIG. 3, for which the pressure exerted by the exterior medium undergoes a fast increase giving rise to the appearance of a resulting pressure, depicted by the arrows 31 in FIG. 3. The effect of this resulting pressure is to give rise to a deformation of the elastic walls 22 of the end caps 14 and 15, which is manifested, in the case of the preferred embodiment taken as example, by a bending $\Delta x_2$ of the elastic wall 22 of the end cap inside the cavity of the hydrophone. This deformation, which induces a decrease in the volume of the cavity and the consequence of which is to increase the internal pressure, continues until the internal and external pressures balance again. In FIG. 3, the initial position of the end cap is represented by dashes.

Figure 4:
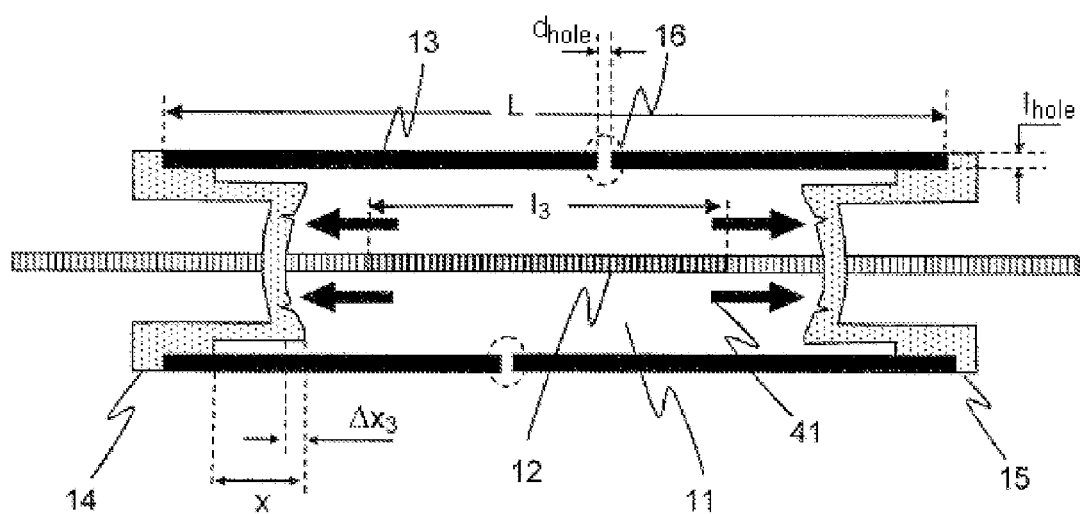

A second dynamic state, illustrated by FIG. 4, for which the pressure exerted by the exterior medium undergoes a fast decrease giving rise to the appearance of a resulting pressure, depicted by the arrows 41 in FIG. 4. The effect of this resulting pressure is to give rise to a deformation of the end caps 14 and 15 which is manifested, in the case of the preferred embodiment taken as example, by a reverse bending $\Delta x_3$ of the elastic wall 22 of the end cap. This deformation, which induces an increase in the volume of the cavity and the consequence of which is to decrease the internal pressure continues until the internal and external pressures balance again. In FIG. 4 the initial position of the end cap is represented by dashes.

According to the invention, the optical fiber element 12 is, as was stated previously, fixed to the wall 22 of each of the end caps which closes the cavity in such a way that, when the hydrophone is assembled, it undergoes a pre-tension. The value of this pre-tension is defined in such a way that when the end cap undergoes its maximum lengthening under the action of an increase in the pressure of the exterior medium, which lengthening is optionally aggregated, with the length variations due to temperature, the optical fiber element 12 retracts but nonetheless remains under the effect of a residual tension which keeps it rectilinear, under tension, as illustrated by FIG. 3. Thus when the resulting pressure varies between a maximum value (positive) considered to the minimum value (negative) considered while passing through a zero value (equilibrium of the pressures), the optical fiber element 12 sees its length vary from a maximum value $l_3$ to a minimum value $l_2$ while passing, at equilibrium, through a length $l_1$ but always remaining under tension, whatever the temperature considered in the temperature range aimed at.

From a dimensional point of view, the device according to the invention is defined so as to meet various requirements.

Thus, the length L of the cylindrical body 13 is determined, in a preferred embodiment, at one and the same time by the length of the Bragg grating optical fiber element 12 housed in the cavity, which length is imposed by construction, and to a lesser extent, by the resonant frequency of the cavity.

Thus again, the dimensions of the through orifice (of the orifices) 16, orifice(s) put in place according to the invention so as to ensure the insensitivity of the device to static pressure, are defined so as to have an optimal span of frequency of use, that is to say a span of frequencies over which the sensitivity of the device complies with the expected value.

In practice, the dimensions of the orifice 16 may be determined by likening the latter to a cylinder of radius $R_{hole}$ and of length $l_{hole}$ and by considering the curve of variation of the sensitivity of a cavity to pressure variations as a function of the frequency of these variations.

Figure 5:
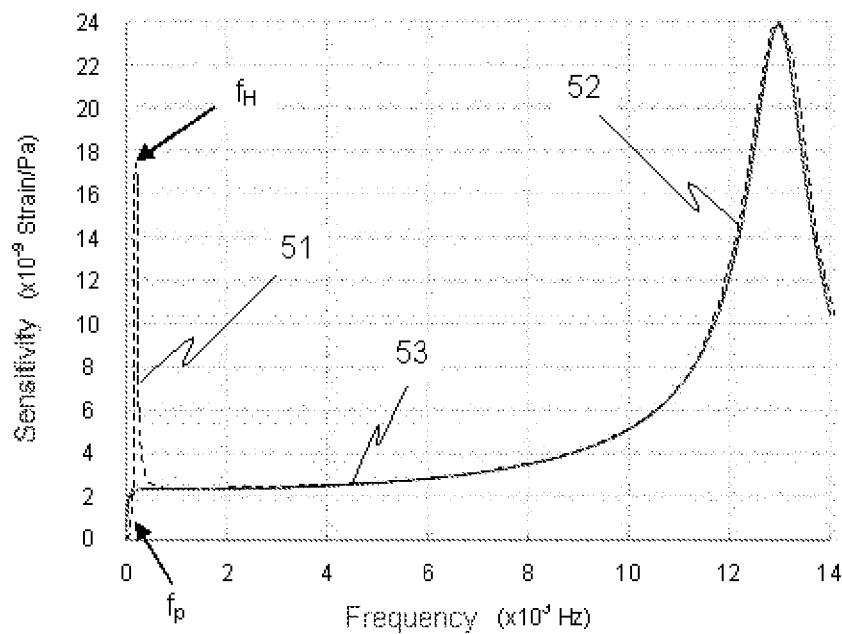
FIG. 5, a curve presenting the form of the law of variation of the sensitivity of a hydrophone according to the invention as a function of the frequency of variation of the pressure exerted by the exterior medium.

As may be noted in the illustration of FIG. 5, a cavity such as that constituted by the device according to the invention, exhibits, under the effect of variations in pressure and on account of the presence of the orifice 16 and of the viscosity of the medium inside the cavity notably, one or two resonance peaks 51 and 52 at frequencies $f_1$ and $f_2$, these frequencies being defined at one and the same time by the volume of the cavity and the dimensions ($R_{hole}$ and $l_{hole}$).

As shown by the two curves of FIG. 5, two distinct behaviors at low frequencies, that is to say faced with low-frequency variations of the pressure exerted by the medium, are distinguished as a function of the viscosity of the fluid contained in the cavity. The first behavior, illustrated by the dashed curve, corresponds to that of only slightly viscous or non-viscous fluids, while the second behavior, illustrated by the solid curve, corresponds to that of viscous liquids. The first behavior is manifested by the presence of two peaks 51 and 52, while the second behavior is manifested by the presence of a single peak 52.

As regards only slightly viscous fluids, the peak 51 indicates that the behavior of the cavity at very low frequencies can be regarded as that of a Helmholtz cavity. The resonance peak 51 appears for variations of low frequencies in particular when the fluid inside the cavity is considered to be non-viscous and/or when the hole is of relatively large diameter, of the order of a mm for example. It is observed that, for these low frequencies, the cavity has a behavior similar to a Helmholtz cavity and that the resonant frequency corresponding to the peak 51 is close to the Helmholtz resonant frequency of the cavity. Now, in the case of a Helmholtz resonator, the cavity is generally modeled by a mass-spring system, the hole behaving as a mass and the cavity playing the role of a stiffness. In accordance with this model, provided that the cylinder is considered to be rigid, the resonant frequency is then defined by the following relation:

$$f_H = \frac{1}{2\pi}\sqrt{\frac{k}{m}} \quad [1]$$

With $m = m_{hole} = \rho S_{hole} l_{hole}$

Accordingly, the stiffness of a fluid filled cavity being defined, by analogy with that of a beam, by the relation:

$$k = k_{cavity} = \frac{\rho c^2 S_{hole}^2}{V_{cavity}}, \quad [2]$$

The expression for the Helmholtz frequency is:

$$f_H = \frac{c}{2\pi}\sqrt{\frac{S_{hole}}{V_{cavity} l_{hole}}} \quad [3]$$

As regards more viscous fluids, the cavity at very low frequencies can simply be regarded as a first-order system modeled by a Poiseuille flow through the hole, this system satisfying the following relation:

$$Q = \frac{\pi R_{hole}^4}{8\eta L_{hole}} \Delta P \quad [4]$$

in which Q represents the flowrate through the hole, $\eta$ the viscosity of the fluid and $\Delta P$ the pressure difference between the interior and the exterior of the cavity at the level of the hole.

The pressure inside the cavity then satisfies the differential equation:

$$\frac{dP}{dt} + \frac{\pi R_{hole}^4 \rho c^2}{8\eta L_{hole} V_{cavity}} P = \frac{\pi R_{hole}^4 \rho c^2}{8\eta L_{hole} V_{cavity}} P_0 \quad [5]$$

The cutoff frequency $f_p$ of the system consisting of the hole, the through orifice, is then defined by the relation:

$$f_P = \frac{R_{hole}^4 \rho c^2}{16\eta L_{hole} V_{cavity}} \quad [6]$$

As illustrated by FIG. 5, in the case of a viscous fluid, an intermediate frequency span is observed between the two resonance peaks 51 and 52, or between the frequency fp (not represented in the figure since it is too close to zero for the scale used) and the frequency of the resonance peak 52 for which the cavity exhibits a substantially constant non-negligible sensitivity and in which the cavity may be used to serve as amplifier of the inherent deformations of the fiber. Indeed, after the first peak 51, or the cutoff frequency $f_p$ in the case of a viscous fluid, the orifice 16 behaves as if it were sealed so that the variations in the exterior pressure are transmitted to the interior medium only by the piston motions followed by the two end caps, or more exactly by the elastic wall 22 of the end cap free to deform, which motions are transmitted to the optical fiber element 12.

It should be noted that the second resonance peak corresponds here to a purely mechanical resonance originating from the two end caps, the frequency of this resonance therefore depending essentially on the geometry of the end caps.

According to the invention, the geometry of the cavity is therefore optimized to obtain a band of use which is as wide as possible. Stated otherwise, the geometry of the cavity is optimized in such a way that the frequency $f_1$ of the first peak, or the cutoff frequency $f_p$ in the case of a viscous fluid, is as low as possible and that the frequency $f_2$ of the second peak is as high as possible.

Now, in addition to the parameters entering the expressions for $f_H$ and $f_p$ (cf. relations 3 and 6), a certain number of parameters, such as the geometric parameters of the cavity, of the piston and of the hole as well as the material used for the piston or else the fluid inside the cavity, can alter these resonant frequencies: Parametric studies conducted elsewhere on the influence of the geometry of the hydrophone on the values of the two frequencies, $f_1$ or fp on the one hand and $f_2$ on the other hand, make it possible to demonstrate diverse results.

It is thus noted that, for a fluid filling the cavity of given viscosity, the diameter of the orifice 16 has no appreciable influence on the frequency $f_2$ of the second peak 52. On the other hand, it is noted that the frequency $f_1$ of the first peak 51, just like the frequency fp, increases with the diameter of the orifice. It is therefore advantageously possible to adjust the value of the frequencies f1 or fp, of the cavity by choosing the diameter of the orifice in an appropriate manner.

It is thus also noted that, in contradistinction to what happens for the orifice 16, the diameter of the cavity influences the values of the frequencies $f_1$ or fp on the one hand and $f_2$ on the other hand. It is noted more precisely that the values of $f_1$, or fp, and $f_2$ vary in the same direction as a function of the diameter of the cavity, toward values which are all the lower the greater the diameter. It is thus advantageously possible to adjust the position of the useful frequency span by choosing the diameter of the cavity in an appropriate manner.

It is further noted that, as previously but in a lesser manner, the length of the cavity simultaneously influences the values of the frequencies $f_1$ or fp, and $f_2$, the values of $f_1$, or fp, and $f_2$ varying toward values which are all the lower the greater the length of the cavity.

It should be noted that other parameters can also influence, although more slightly, the position on the frequency axis and the width of the hydrophone's utilization band. It is possible to cite for example the elasticity of the material used to make the end caps sealing the cavity of the device according to the invention or else the nature of the fluid inside the cavity. However, insofar as these parameters make it possible to adjust other operating characteristics of the device, these are not taken into account in adjusting the operating span of the device.

From the dimensional point of view also, the diameter, or more generally the aperture, of the cylindrical body 13 determines the dimensions of the end caps and in particular dimensions of the cylindrical wall 21 of a end cap.

The dimensions of a end cap are, for their part, determined so as to obtain the desired amplification of the longitudinal deformation imposed on the optical fiber element by the pressure variations and to compensate for the effects of the variations in temperature on the length l of the optical fiber element.

In particular, the insensitivity of the device according to the invention to temperature variations is achieved by altering the geometry of the end caps. Indeed, the temperature variations cause on the one hand a variation in index within the fiber 12 and on the other hand a variation in the length of the end caps 14 and 15 from which the elongation or retraction of the fiber 12 originates. Therefore, a judicious choice of the dimensions of the end caps, for a given end cap material, makes it possible to compensate exactly or substantially for the variation in the emission frequency of the optical fiber laser cavity 12 under the action of the temperature by varying the length of this optical fiber element as a function of temperature.

Thus, for a temperature variation $\Delta T$, the variation in the wavelength due to the variation in the index n of the optical fiber element 12 is defined by the relation:

$$\frac{\Delta\lambda}{\lambda} = \frac{1}{n} \cdot \frac{dn}{dT} \cdot \Delta T \qquad [7]$$

Now, the variation in the wavelength as a function of the variation in the length L of the fiber is defined by the relation:

$$\frac{\Delta\lambda}{\lambda} = K \cdot \frac{\Delta L_{fiber}}{L_{fiber}} \qquad [8]$$

Therefore, to compensate for the variation in index, the variation in the length $L_{fiber}$ for a temperature variation $\Delta T$ must give rise to a variation in the wavelength opposite to the variation caused by the variation in the index n. The variation in the length $L_{fiber}$ is therefore thus defined by the following equality:

$$\frac{\Delta L_{fiber}}{L_{fiber}} = -\frac{1}{Kn} \cdot \frac{dn}{dT} \Delta T. \qquad [9]$$

Now, as regards the device according to the invention, if it is considered that the cylindrical body 13 defining the cavity is rigid and hardly sensitive to the temperature variations considered, it is advantageously possible to express the elongation $\Delta L_{fiber}$ undergone by the optical fiber element 12 housed in the cavity, which element is secured to the end caps 14 and 15, as a function of the variation in length of the end caps under the effect of the temperature variation $\Delta T$ and therefore to dimension the end caps in an appropriate manner so that their variation in length gives rise to the variation $\Delta L_{fiber}$ in length of the fiber making it possible to compensate exactly or substantially for the variation in the index n. This may be achieved in several ways.

In the case of the preferred embodiment serving as support to the description of the invention and illustrated by FIGS. 1 and 2 notably, the dimensioning of the end cap is carried out by considering that $\Delta L_{fiber}$ is defined by the following relations:

$$\begin{aligned}\Delta L_{fiber} &= \Delta L_{tube} - 2\Delta x \qquad [10]\\ &= \alpha_{tube} \cdot L_{tube} \Delta T - 2\alpha_{piston} \cdot x\Delta T\\ &= \alpha_{tube} \cdot (L_{fiber} + 2x)\Delta T - 2\alpha_{piston} \cdot x\Delta T\end{aligned}$$

In which $\alpha_{tube}$ and $\alpha_{piston}$ represent the coefficients of thermal expansion of the materials constituting respectively the cylindrical body 13 and the end caps 14 and 15 or, at least, the free cross-section C, of the end caps and $\Delta T$ the temperature variation. The length x is the length of the mobile part which is, here, the length of the free cross-section C.

Therefore, to achieve effective temperature compensation, the dimensions of the end caps must be determined in such a way that the length x is defined by the following relation:

$$x = \frac{L_{fiber}}{2(\alpha_{piston} - \alpha_{tube})} \cdot \left(\alpha_{tube} + \frac{1}{Kn} \cdot \frac{dn}{dT}\right) \quad [11]$$

It is recalled that $L_{fiber}$ is the length of the fiber, that $\alpha_{tube}$ and $\alpha_{piston}$ represent the coefficients of thermal expansion of the materials constituting respectively the cylindrical body 21 and the end caps 14, 15 or, at least, the free cross-section C, n represents the index of the cavity, dn/dT the variation in the index of the cavity per unit temperature.

It is noted that this length x is independent of ΔT and depends only on the properties of the materials used and the length $L_{fiber}$ of the fiber fixed between the end caps.

Generally, the end cap can exhibit different shapes, but it is always possible to find a material and a geometry of the mobile part of the end caps which satisfies relation 9 in a wide temperature range. In the case of a complex geometry, a three-dimensional thermal calculation by the finite element procedure makes it possible to arrive at the optimal length of the mobile part of the end caps.

It should be noted that from a practical point of view, in order to avoid too great a piston length, it is advantageous to use, as stated previously, a material having a low thermal expansion to make the cylindrical body 13 and a strongly expanding material to make the end caps 14 and 15. It is possible to choose for example titanium for the cylindrical body ($\alpha_{tube}$=8.6 μm/m/K) and Delrin® for the piston ($\alpha_{piston}$=90 μm/m/K). A length x equal to 4.7 mm is then obtained, for a fiber length of 42.5 mm.

As stated previously, the device according to the invention is therefore defined from a structural point of view, as a device comprising a cylindrical body 13 of rigid material, with a low expansion coefficient and end caps 14 and 15 of material with a large expansion coefficient, these elements defining a cavity in which the Bragg grating optical fiber element 12 is housed. Such as is defined and independently of the fluid filling the cavity, the device is advantageously hardly sensitive to temperature variations and to variations in static pressure. It makes it possible advantageously to amplify the length variations imposed on the optical fiber element 12 by the dynamic variations in pressure. However, studies conducted elsewhere demonstrate that the nature of the fluid contained in the cavity conditions the sensitivity of the device.

Figure 6:
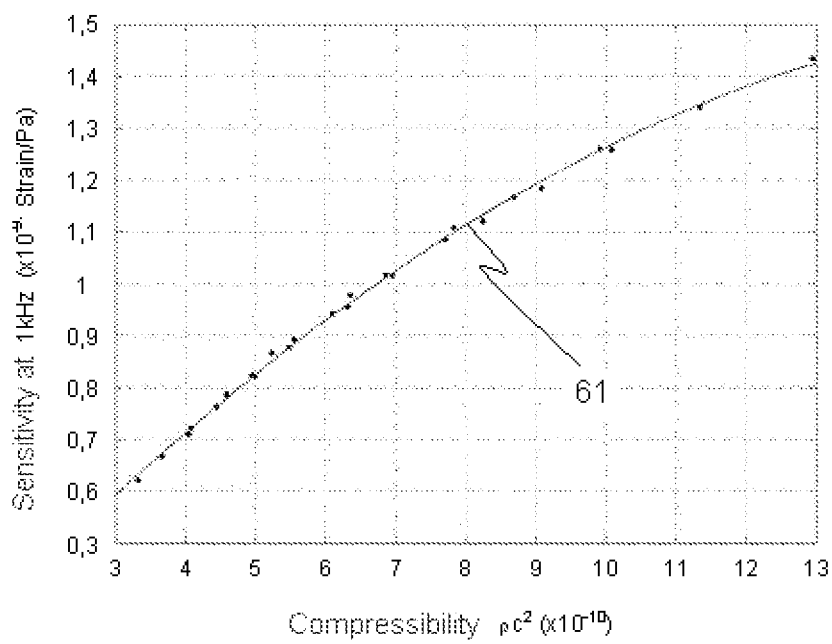
FIG. 6, a curve presenting the form of the variation of the sensitivity of the hydrophone according to the invention as a function of the compressibility of the fluid contained in the cavity of the hydrophone.

In practice, the sensitivity of this hydrophone hardly depends on the geometric parameters. It depends predominantly on the compressibility of the fluid used. Therefore, it is thus possible to increase the sensitivity of the hydrophone according to the invention by using a more compressible fluid than water to fill the cavity of the hydrophone. It is thus possible, for example, to choose an oil in place of water. The curve of FIG. 6 gives the form 61, for a dynamic variation in pressure of frequency equal to 1 kHz, of the variation in the sensitivity of an optical hydrophone according to the invention as a function of the compressibility of the fluid used to fill the cavity.

As also mentioned in the foregoing text, the optical fiber element 12 housed in the cavity is fixed to the end caps 14 and 15 in such a way as to undergo a tension prestrain the value of which is defined such that whatever the dynamic pressure variations imposed by the exterior medium and, whatever the lengthening due to temperature variations, it is kept under tension. Therefore the fiber element 12 behaves as a vibrating cord whose resonant frequency depends on its free length and its lineal mass as well as the prestrain applied to it.

The consequence of this prestrain is that natural resonant frequencies whose values are directly dependent on the pretension applied are conferred on the fiber element 12. Now, within the framework of the invention, the tension prestrain applied to the fiber depends directly on the operating temperature range. Indeed, the temperature insensitivity of the device according to the invention is obtained by varying the length of the fiber element in such a way that the wavelength λ remains constant. The variation in the length of the fiber being itself induced by the deformation of the end caps to which it is fixed under the action of temperature, the axial deformation notably.

Therefore, the tensile force F applied to the fiber element 12 being fixed the same holds for the natural modes of vibration of the fiber element 12. Now, one or more of these natural modes may correspond to resonant frequencies lying in the span of use of the device so that for these frequencies, the sensitivity of the device is impaired.

These natural modes may be determined in a known manner by considering the tensile force F applied to the fiber element 12 to keep the latter under pre-tension and the speed of propagation of a deformation wave along the vibrating cord constituted by this element.

Indeed, the tensile force F applied to the fiber element 12 may be defined by the following relation:

$$F = kx = \frac{ES}{l}\delta L \quad [12]$$

where E represents Young's modulus for silica (the material constituting the fiber), where S and l represent respectively the cross-section and the length of the fiber, and where δL represents the lengthening imposed on the fiber. This lengthening is determined by taking into account the lengthening of the fiber as a function of the temperature variation considered.

The propagation speed v of a wave in the vibrating cord constituted by the fiber element 12, subjected to the tension force F, is moreover defined by the expression:

$$v = \sqrt{\frac{F}{\mu}} \quad [13]$$

Where μ is the linear mass of the fiber.

The natural vibration modes of the cord are for their part obtained for wavelengths such that:

$$L = \frac{n\lambda}{2} \quad [14]$$

where L represents the length of the fiber and n an integer.

Therefore, the natural resonant frequencies of the vibrating cord constituted by the optical fiber element 12 are defined by the following relation:

$$f = \frac{n}{2L}\sqrt{\frac{T}{\mu}} \quad [15]$$

Thus, for example, for an optical fiber element of length l=42 mm made from a silica fiber of diameter equal to 250 μm and exhibiting a relative variation in length equal to 9.36 μm/m/° C., the fiber lengthening δL obtained for a temperature variation of 50° C. is substantially equal to 23.4 μm and the tension F to be applied is substantially equal to 0.6 N. The application of this tension itself induces the occurrence of natural resonant frequencies at the level of the optical fiber element 12, the first of these natural frequencies having a value substantially equal to 1500 Hz.

Therefore, if this value lies in the frequency span of use of the hydrophone, this natural resonant mode will be excited as soon as a transverse acceleration of identical frequency is exerted by the exterior medium. Such an acceleration, due essentially to mechanical disturbances caused, for example, by the motions of the acoustic antenna into which the hydrophone is integrated, introduces a disturbance of the sensitivity of the hydrophone.

Therefore, in such a configuration, it becomes necessary to damp the natural vibration modes of the optical fiber element 12.

According to the invention, this damping may be obtained by altering the viscosity of the fluid contained in the cavity of the hydrophone.

Alternatively, it can also be obtained by enclosing the fiber element 12 inside a metallic cylinder filled with gel and to center this cylinder inside the cavity of the hydrophone, the cavity itself being filled with a fluid serving to transmit the pressure variations imposed by the exterior medium.

Alternatively again, it can also be obtained by filling the cavity of the hydrophone with the aid of an open foam, impregnated with fluid. The nature of the foam is then determined in such a way that it damps the vibrations of the optical fiber element 12 without substantially modifying the behavior of the cavity in relation to the pressure variations.

FIGS. 7 and 8 present in a schematic manner the structure of an alternative variant embodiment of the device according to the invention. In this alternative, the cylindrical body 13 does not exhibit any orifice 16. On the other hand, through orifices 71 are here made in the thickness of the end caps 14 and 15.

With respect to the general embodiment presented previously and illustrated by FIGS. 1 and 2, this embodiment makes it possible advantageously on the one hand to leave the cylindrical body 13 intact from any drilling and on the other hand to obtain orifices exhibiting a length $l_{hole}$ that is greater than the thickness of the wall of the cylindrical body and therefore to design hydrophones exhibiting a lower Helmholtz frequency than in the previous embodiment (cf. relation [3]).

It should be noted that insofar as the presence of one or more through orifices 16 corresponds to an essential characteristic of the invention, the device according to the invention comprises such orifices whatever embodiment is envisaged.

However instead of consisting of one or more holes made in the cylindrical body 13 or in the end caps 14 and 15, the function of the through orifices 16 may, in an alternative embodiment where the rigid body 13, or else a part of the rigid body, is made of a porous material, be fulfilled by the pores of the material.

Likewise, in an alternative embodiment where the end caps are made, in part or entirely, from a porous material, the function of the through orifices 16 may be fulfilled by the pores of the material.

The invention claimed is:

1. A optical hydrophone comprising:
   an active optical fiber element with Bragg gratings inscribed in the active optical fiber element forming the laser cavity;
   a mechanical structure forming a cavity filled with a fluid, and inside which the active optical fiber element is placed along a longitudinal axis of the cavity, the mechanical structure comprising:
   a substantially cylindrical hollow rigid body forming the cavity inside which the optical fiber element is placed;
   two end caps configured and designed to seal the ends of the substantially cylindrical hollow rigid body and traversed by the active optical fiber element, said active optical fiber element being fixed with a pre-strain to the end caps at a level of points of traversal to be permanently under tension,
      wherein the two end caps each comprise a part rigidly tied to the substantially cylindrical hollow rigid body, and a mobile part able to expand or contract along the longitudinal axis under the effect of a temperature variations, the mobile part comprising a deformable wall deformed when subjected to variations in a pressure exerted by an exterior medium in which the optical hydrophone is immersed, the deformation of the end caps giving rise to a variation of a length of the active optical fiber element,
   the deformable wall comprising an internal face directed toward an interior of the cavity and an external face directed toward an exterior of the cavity and the internal face being translated with respect to the substantially cylindrical hollow rigid body along the longitudinal axis of the cavity by expansion or contraction of the respective mobile part under an effect of temperature variations of the exterior medium in which the optical hydrophone is immersed, giving rise to a variation in the length of the active optical fiber element, such that the variation in the length at least partially compensates the variations of an emission frequency of the laser cavity as a result of the temperature variations; and
   a through orifice configured to allow communication between the cavity and the exterior medium and to achieve equilibration of a static pressure between the exterior medium and the fluid contained in the cavity.

2. The optical hydrophone as claimed in claim 1, wherein the deformable wall is expandable and mobile with respect to the substantially hollow rigid body by expansion or contraction of the respective mobile part of the respective end cap under the temperature variation of the exterior medium in which the optical hydrophone is immersed.

3. The optical hydrophone as claimed in claim 2, wherein each of the end caps comprises:
   a substantially cylindrical hollow body shape, said hollow cylindrical body shape being a hollow cylinder shape, comprising a first end and a second end, the hollow cylinder shape being opened at the first end, said hollow cylinder shape being configured to be inserted into the cavity to seal one end of the substantially cylindrical hollow rigid body thereof, each said end-cap exhibiting a side-wall and an elastic end-wall, perpendicular to the longitudinal axis of the cavity, and sealing the second end of the end cap that is inserted into the cavity, the elastic end-wall being said deformable wall, the side-wall comprising a segment for which a thickness is defined such that the side-wall of the end cap can deform freely in the longitudinal direction due to the temperature variations.

4. The optical hydrophone as claimed in claim 1, wherein the substantially cylindrical hollow rigid body and the two end caps are configured such that the optical hydrophone exhibits symmetry planes arranged to minimize a sensitivity to parasitic accelerations.

5. The optical hydrophone as claimed in claim 1, wherein:
dimensions of the substantially cylindrical hollow rigid hollow body are defined such that the cavity formed can accommodate the active optical fiber element, and
having regard to respective dimensions thereof, the end caps undergo, due to dynamic variations in the pressure exerted by the exterior medium, a deformation sufficient to induce on the active optical fiber element a variation in length to obtain a desired sensitivity of the optical hydrophone to the dynamic variations in pressure.

6. The optical hydrophone as claimed in claim 1, wherein the dimensions including a length $l_{hole}$ and a cross-section $S_{hole}$, of the through orifice are determined such that, with regard to a viscosity of the fluid contained in the optical hydrophone, the optical hydrophone exhibits, with regard to a volume $V_{cavity}$ thereof, a variation of a sensitivity thereof to variations in the pressure, as a function of a frequency of said variations in the pressure, exhibiting, in a given pressure variation frequency bandwidth, a substantially constant sensitivity, said pressure variation frequency bandwidth being situated before a frequency F2 corresponding to a mechanical resonance peak of the cavity.

7. The optical hydrophone as claimed in claim 6, wherein:
when the fluid contained in the cavity is of a low viscosity, the dimensions of the through orifice are determined such that, the pressure variation frequency bandwidth for which the sensitivity of the cavity of the optical hydrophone is substantially constant between the frequency F2 and a resonance peak at a frequency F1 equal to a Helmholtz frequency $f_H$ of the cavity defined by:

$$f_H = \frac{c}{2\pi}\sqrt{\frac{S_{hole}}{V_{cavity} l_{hole}}}$$

where c represents a velocity of the acoustic waves in the fluid, and
the frequency $f_H$ is at a minimum value.

8. The optical hydrophone as claimed in claim 6, wherein:
when the fluid contained in the cavity is viscous, the dimensions of the through orifice are determined such that, the pressure variation frequency bandwidth for which the sensitivity of the cavity of the optical hydrophone is substantially constant lying between the frequency F2 and a frequency F1 equal to a cutoff frequency $f_p$ of the cavity defined by:

$$f_P = \frac{R_{hole}^4 \rho c^2}{16 \eta l_{hole} V_{cavity}}$$

wherein ρ represents a density of the fluid, c the velocity of the acoustic waves in the fluid and $R_{hole}$ is a radius of the through orifice; and
the frequency fp is at a corresponding minimum value.

9. The optical hydrophone as claimed in claim 1, wherein dimensions of the cavity and materials constituting the substantially cylindrical hollow rigid body and the two end caps are determined to obtain a maximum value for the frequency F2.

10. The optical hydrophone as claimed in claim 1, wherein the side-wall comprises a first segment B for which a thickness of a material constituting the side-wall is determined such that the side-wall of the end caps comes into tight contact with an internal wall of the substantially cylindrical hollow rigid body, to ensure a rigid link between the substantially cylindrical hollow rigid body and the two end caps.

11. The optical hydrophone as claimed in claim 1; wherein the side-wall of the two end caps further comprises an end-segment A whose thickness defines a shoulder which abuts the ends of the substantially cylindrical hollow rigid body when the two end caps are put in place on the substantially cylindrical hollow rigid body.

12. The optical hydrophone as claimed in claim 1, wherein the cavity accommodating the optical fiber element contains an open foam, said open foam being soaked with the fluid contained in the cavity, a material constituting the open foam being defined to damp resonant modes of the optical fiber element.

13. The optical hydrophone as claimed in claim 1, wherein the through orifice is a circular orifice made through a wall of the substantially cylindrical hollow rigid body.

14. The optical hydrophone as claimed in claim 1, wherein the through orifice is a circular orifice made longitudinally in the of the side-wall of an end cap in the two end caps.

15. The optical hydrophone as claimed in claim 1, wherein the substantially cylindrical hollow rigid body or the two end caps are made entirely or in part from a porous material, the through orifice consisting of the pores of the porous material.

16. The optical hydrophone as claimed in claim 1, wherein a length x of the expandable internal face is defined by $$x = \frac{L_{fiber}}{2(\alpha_{piston} - \alpha_{tube})} \cdot \left(\alpha_{tube} + \frac{1}{Kn} \cdot \frac{dn}{dT}\right)$$

where $L_{fiber}$ is a length of the active optical fiber element, $\alpha_{tube}$ and $\alpha_{piston}$ represent coefficients of thermal expansion of materials constituting respectively the substantially cylindrical hollow body and the two end caps or, at least, a free cross-section C, n represents a refractive index of the cavity, dn/dT the variation, per unit temperature, of the refractive index of the cavity.

17. The optical hydrophone as claimed in claim 1, wherein the two end caps are dimensioned, with regard to a material from which the two end caps are made, such that a displacement of the internal faces of the deformable walls of the two end caps, along the longitudinal axis of the cavity, gives rise to a variation of a length of the active optical fiber element which compensates substantially the variation of emission frequency of the cavity as a result of the temperature variations.

18. The optical hydrophone as claimed in claim 1, wherein a material and a geometry of the mobile part is such that the variation in the length at least partially compensates the variations of the emission frequency of the laser cavity as a result of the temperature variations.

19. The optical hydrophone as claimed in claim 1, wherein each one of the end caps being locked against a mechanical stop of the respective end cap, the mechanical stop being separated from the internal face by a non-zero distance along the longitudinal axis.

20. The optical hydrophone as claimed in claim 1, wherein the side-wall of each of the end caps contracts or expands freely in the longitudinal direction due to the temperature variations.

* * * * *

UNITED STATES PATENT AND TRADEMARK OFFICE
CERTIFICATE OF CORRECTION

| | |
|---|---|
| PATENT NO. | : 9,103,713 B2 |
| APPLICATION NO. | : 13/642519 |
| DATED | : August 11, 2015 |
| INVENTOR(S) | : Francois-Xavier Launay et al. |

It is certified that error appears in the above-identified patent and that said Letters Patent is hereby corrected as shown below:

In the claims:

Column 19, line 57, claim 8, "the frequency fp" should be --the frequency fρ--.

Column 19, line 58, claim 9, "claimed in claim 1" should be --claimed in claim 6--.

Signed and Sealed this
Seventh Day of June, 2016

Michelle K. Lee
*Director of the United States Patent and Trademark Office*